United States Patent [19]
Kazirskis et al.

[11] Patent Number: 5,966,308
[45] Date of Patent: Oct. 12, 1999

[54] REMOTELY OPERATED, AUTOMATIC CONTOUR MAPPING, MACHINING AND WELDING TOOLING SYSTEM

[75] Inventors: Benedict Kazirskis, Barto; James Cassidy Donohue, Sharon Hill, both of Pa.

[73] Assignee: General Electric Company, San Jose, Calif.

[21] Appl. No.: 08/364,881

[22] Filed: Dec. 27, 1994

[51] Int. Cl.⁶ .............. G06F 19/00; B23K 37/02
[52] U.S. Cl. .................. 364/474.37; 29/402.18; 219/24.34; 228/102; 228/119; 376/260
[58] Field of Search .................. 72/7, 8, 9–13, 72/16, 28; 364/474.07, 474.37, 474.22, 474.24, 474.26, 472.01, 476.01, 472.02; 250/234, 562; 376/260; 219/124.21, 124.34; 29/402.18; 228/102, 119

[56] References Cited

U.S. PATENT DOCUMENTS

| | | | |
|---|---|---|---|
| Re. 30,639 | 6/1981 | Hofstede et al. | 72/8 |
| 4,719,577 | 1/1988 | Eley | 364/474.07 |
| 4,964,059 | 10/1990 | Sugaya et al. | 364/507 |
| 5,107,093 | 4/1992 | Ekelöf et al. | 219/124.34 |
| 5,315,522 | 5/1994 | Kauffman et al. | 364/474.07 |
| 5,362,962 | 11/1994 | Barborak et al. | 250/234 |
| 5,408,883 | 4/1995 | Clark, Jr. et al. | 73/601 |
| 5,515,589 | 5/1996 | Kazirskis et al. | 29/402.1 |

*Primary Examiner*—Paul P. Gordon
*Attorney, Agent, or Firm*—James E. McGiness; Dennis M. Flaherty

[57] ABSTRACT

An apparatus for upgrading/repairing existing piping systems of a nuclear reactor without removal/replacement of the old piping. The process involves the steps of machining a counterbore of exposed corrosion-susceptible material and then depositing a corrosion-resistant weld material, thereby isolating the weld joint from corrosion susceptibility. A tool is inserted into the inside diameter of the piping system through an inspection port, valve body or segment removal. Then a tool mounting fixture equipped with axial and rotational capabilities is positioned in relation to the weld joint and locked in place. The tool mounting fixture remains locked in place throughout the entire repair process. A work surface mapping module is programmed to first gather relative reference points throughout the entire repair region. Upon data acquisition completion, the system creates a map of the existing inside diameter configuration. Then in successive stages, a machining head module and a welding head module are respectively manually installed and remotely operated by computer control. The machining and welding processes follow the existing configuration such that upon completion, the final repair blends with the piping inside diameter contour.

20 Claims, 11 Drawing Sheets

REMOTELY OPERATED, AUTOMATIC CONTOUR MAPPING, MACHINING AND WELDING TOOLING SYSTEM

FIELD OF THE INVENTION

This invention relates to the welding of piping and other residual stress-sensitive components. In particular, the invention relates to the welding of piping and other components used in nuclear reactors, which components are susceptible to stress corrosion cracking in the heat affected zones adjacent a weldment.

BACKGROUND OF THE INVENTION

A nuclear reactor comprises a core of fissionable fuel which generates heat during fission. The heat is removed from the fuel core by the reactor coolant, i.e. water, which is contained in a reactor pressure vessel. Respective piping circuits carry the heated water or steam to the steam generators or turbines and carry circulated water or feedwater back to the vessel. Operating pressures and temperatures for the reactor pressure vessel are about 7 MPa and 288° C. for a boiling water reactor (BWR), and about 15 MPa and 320° C. for a pressurized water reactor (PWR). The materials used in both BWRs and PWRs must withstand various loading, environmental and radiation conditions. As used herein, the term "high-temperature water" means water having a temperature of about 150° C. or greater, steam, or the condensate thereof.

Some of the materials exposed to high-temperature water include carbon steel, alloy steel, stainless steel, and nickel-based, cobalt-based and zirconium-based alloys. Despite careful selection and treatment of these materials for use in water reactors, corrosion occurs on the materials exposed to the high-temperature water. Such corrosion contributes to a variety of problems, e.g., stress corrosion cracking, crevice corrosion, erosion corrosion, sticking of pressure relief valves and buildup of the gamma radiation-emitting Co-60 isotope.

Stress corrosion cracking (SCC) is a known phenomenon occurring in reactor components, such as structural members, piping, fasteners, and welds, exposed to high-temperature water. As used herein, SCC refers to cracking propagated by static or dynamic tensile stressing in combination with corrosion at the crack tip. The reactor components are subject to a variety of stresses associated with, e.g., differences in thermal expansion, the operating pressure needed for the containment of the reactor cooling water, and other sources such as residual stress from welding, cold working and other asymmetric metal treatments. In addition, water chemistry, welding, heat treatment, and radiation can increase the susceptibility of metal in a component to SCC.

In particular, intergranular stress corrosion cracking (IGSCC) occurs in nuclear plant piping systems. Certain weld materials exposed to the reactor water environment are highly susceptible to IGSCC. The present methodology for addressing IGSCC-susceptible piping systems is to remove the entire piping system and replace it with new materials. This is an expensive approach as it involves special materials, requires disposal of old radioactive materials and is very labor intensive. Thus, there is a need for a system for upgrading/repairing existing piping systems without removal/replacement of the old piping.

SUMMARY OF THE INVENTION

The present invention is a method and an apparatus for upgrading/repairing existing piping systems of a nuclear reactor without removal/replacement of the old piping. The process involves the steps of machining a counterbore of the exposed corrosion-susceptible material and subsequently depositing a corrosion-resistant weld material, thereby isolating the weld joint from IGSCC susceptibility.

In accordance with the invention, a tool is inserted into the inside diameter of large-bore piping through smaller-bore penetration piping. The penetration can be made via an inspection port, a valve body or segment removal. After a designated weld joint to be repaired has been located, a tool mounting fixture equipped with axial and rotational capabilities is positioned in relation to the weld joint and locked in place. The tool mounting fixture remains locked in place throughout the entire repair process.

In accordance with the present invention, interchangeable center bars, carrying uniquely configured workhead modules, can be installed in the tool mounting fixture. The center bars run through the center of the assembly, accessing the inside surface of the large-bore piping. Wiring for controlling and powering the workhead modules is passed through a longitudinal channel formed in the center bar. The end of the bar which accesses the large-bore piping internal diameter, features keyways and a draw rod for mounting specific workhead modules. In the event of a workhead module failure within the large-bore piping, the draw rod can be loosened, thereby separating the workhead module from the center bar for removal.

The workhead modules are specifically designed to perform separate operations. Common to all workhead modules is the ability to fully collapse into an envelope to allow passage through the penetration piping. A scissors jack module is utilized to manipulate the mapping device and the machining motor. The jack motion is perpendicular to the center bar axis, providing the necessary radial reach for the workhead modules. The jack stand-off is set for each cycle of mapping/machining center bar rotation. The mapping/machining center bar then follows the rise and fall of the inside surface through the axial and radial manipulation motions powered from outside of the piping.

The tool is capable of automatically generating a profile of the existing surface and then repeating the motions required to follow the mapped contours. The tool is programmed to first gather relative reference points throughout the entire repair region. A center bar of the tool is secured to the tool mounting fixture. A work surface mapping module is mounted on the center bar. The rotational axis indexes at a predetermined increment, after which the center bar strokes axially until an insulated tip on the probe contacts the inside diameter surface. Once contact is made, a computer program records reference encoder readouts of the various motors. Upon data acquisition completion, the system creates a map of the existing inside diameter configuration. Then in successive stages, a machining head module and a welding head module are respectively manually installed and remotely operated by computer control. The machining and welding processes follow the existing configuration such that upon completion, the final repair blends with the piping inside diameter contour, rather than disrupting the flow path inside the piping. This ability to map and manipulate the existing contour becomes increasingly significant as connections undertake complex geometric intersections.

After the inside diameter data points are collected and a contour map is generated, the center bar is withdrawn from the tool system. The mounting fixture remains clamped to the piping system, maintaining a fixed reference position. Then the work surface mapping module is removed and a special machine head is mounted on the scissors jack module of the mapping/machining center bar. The center bar with machine head is then reinstalled in the mounting fixture. The scissors jack mechanism allows the machine head to fully collapse for insertion and then open up for its required manipulation in conjunction with the axial and rotational capabilities of the mounting fixture. In particular, machining is performed with a specially developed radius nose burr bit, which is used to automatically remove a predetermined amount of material from the IGSCC-susceptible weld joint.

Upon completion of the machining, the center bar used for mapping and machining is again withdrawn. Then a specially designed multi-axis weld head module is mounted on a welding center bar. Although different in structure than the mapping/machining center bar, the welding center bar is also installable in the mounting fixture. Initially, the weld head is fully collapsed within the envelope of the welding center bar for insertion purposes. Once in position at the machined joint, the weld head "unfolds", offering several additional degrees of motion manipulation which are required for weld metal deposition, i.e., maintaining torch tangential position relative to changing contours of the inside diameter of the piping system. The initial mapping data is transposed to the plane relative for weld head manipulation. The computer program automatically transposes this information to allow for weld metal deposition, blending the final weld layer with the existing contour of the piping system inside diameter.

The welding module consists of several small modules which, when synchronized, provide all the necessary motions required to deposit the cladding. The main motions for the welding module are tilting, rotation and oscillation. These motions fit within the large-bore pipe internal diameter. An automatic voltage control sensing and compensation feature provides precise tungsten to workpiece positioning. A miniature video camera focuses on the weld puddle. A motorized wire aimer is also featured, allowing the operator to precisely feed the wire into the welding path. These and other features are specifically designed to provide remote welding capabilities.

The system includes a motion control system program for triggering specific welding functions, torch oscillation, dwell time, torch travel speed, etc. A commercially available weld power supply can be modified and integrated with the motion control system.

DETAILED DESCRIPTION OF THE PREFERRED EMBODIMENTS

Figure 7:
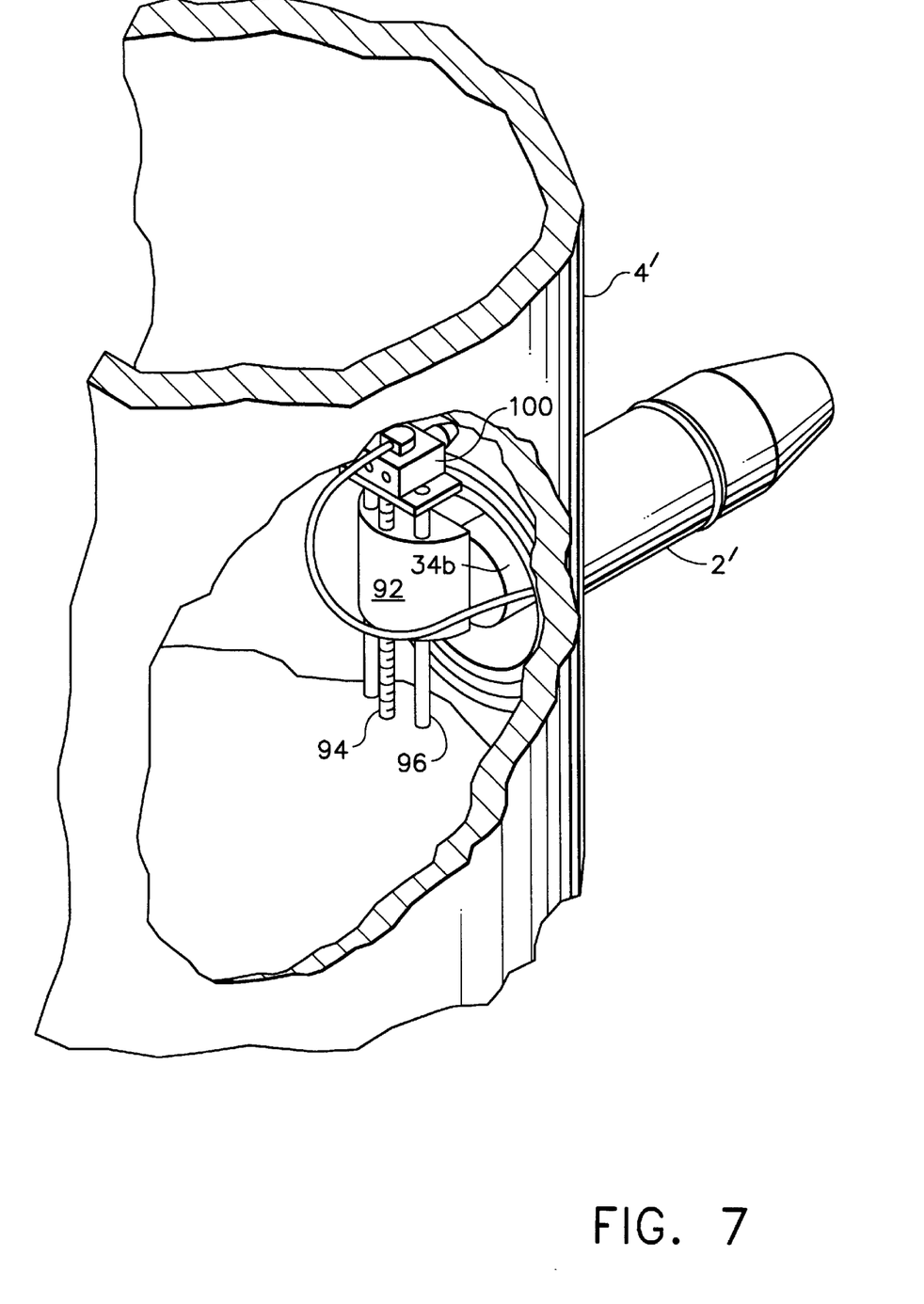
FIG. 7 is an isometric view of a simplified weld head in accordance with another preferred embodiment of the invention.

In accordance with the repair method of the present invention, existing piping systems of a nuclear reactor can be upgraded or repaired without removal or replacement of the old piping. The steps involved in this repair process are generally depicted in FIGS. 1A to 1G, which show the repair of piping having a relatively complex geometry. That complex geometry includes a nozzle 2 which is welded to a curved elbow pipe 4 along a weld joint 6 which is susceptible to IGSCC. A connection pipe 8 is welded to a transition piece or so-called "safe end" 10, which is in turn welded to the nozzle 2. The method of the invention also has application to piping of simpler geometry, e.g., coaxial butt-welded straight pipes or a nozzle joined to a straight pipe in a T shape (such as is depicted in FIG. 7). The repair of the weld joint connecting a nozzle to an elbow pipe will be described with reference to FIGS. 1A–1G, with the understanding that the method of the invention has application to pipe connections of varied geometry.

In the first step of the repair method (see FIG. 1A), the portion consisting the connection pipe 8 welded to the transition piece 10 is severed at the nozzle/transition piece weld joint using a conventional guillotine saw 12.

Figure 1A:
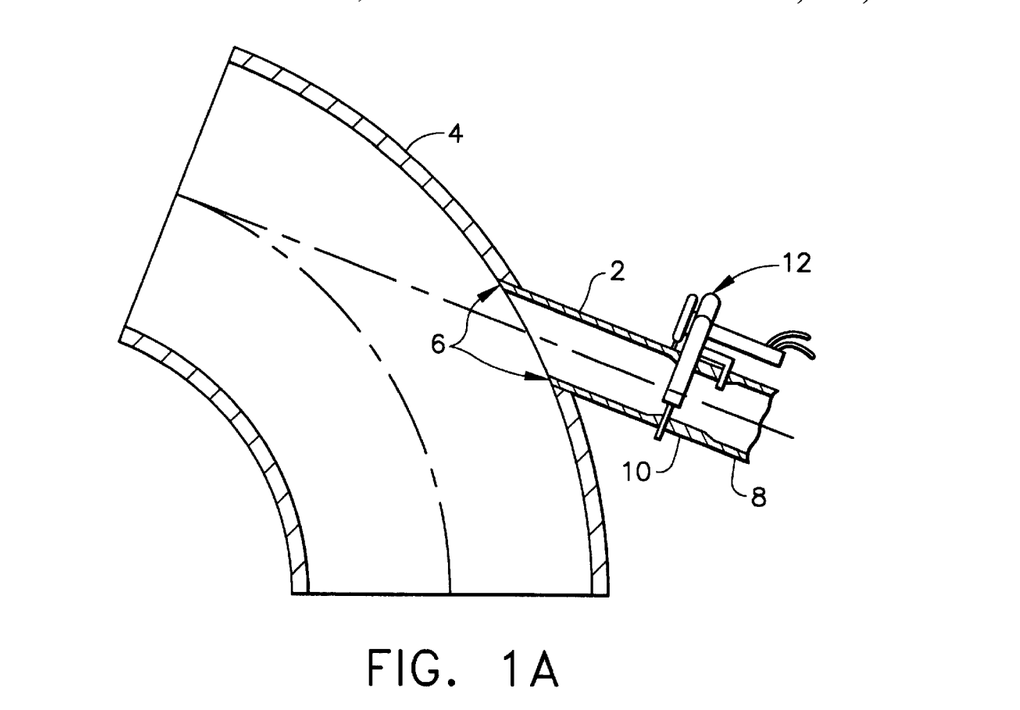
FIGS. 1A, 1B, 1C, 1D, 1E, 1F, and 1G are schematic diagrams depicting the tooling sequence in accordance with the piping repair method of the present invention.
Figure 1B:
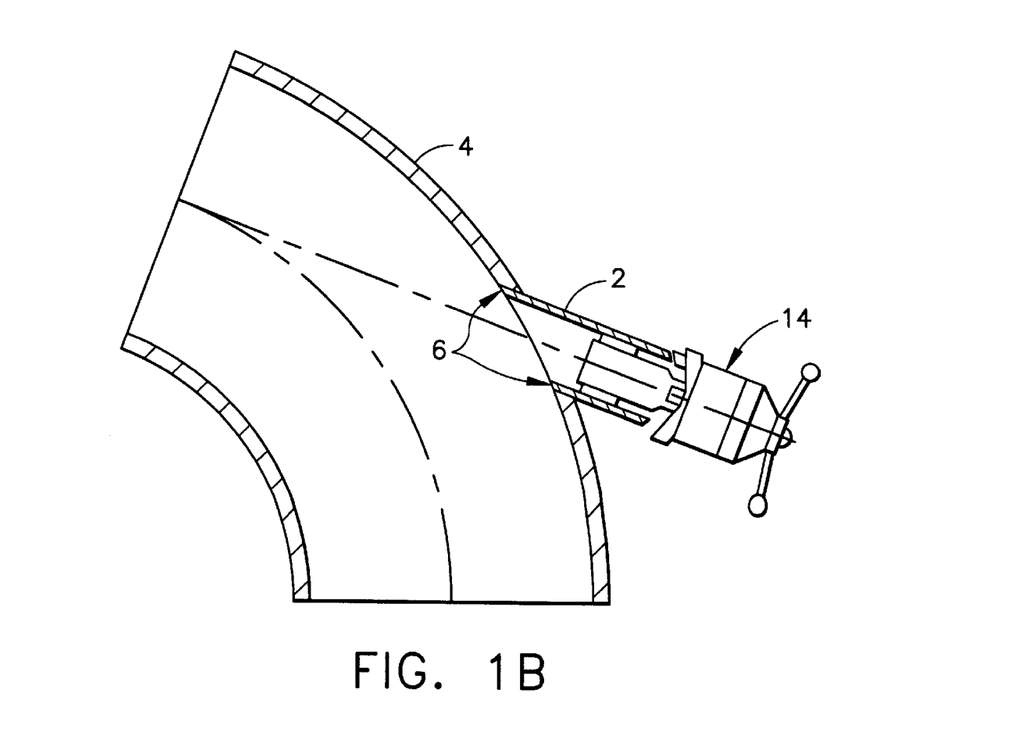

In the second step depicted in FIG. 1B, the exposed end of nozzle 2 is prepared using a conventional pipe preparation machine 14. First, the end of the nozzle is machined back to a given length and then squared. Then the nozzle is machined to form a bevel for the weld joint. Lastly, the nozzle end is machined to form a counterbore so that the diameter of the mating piece will match.

Figure 1C:
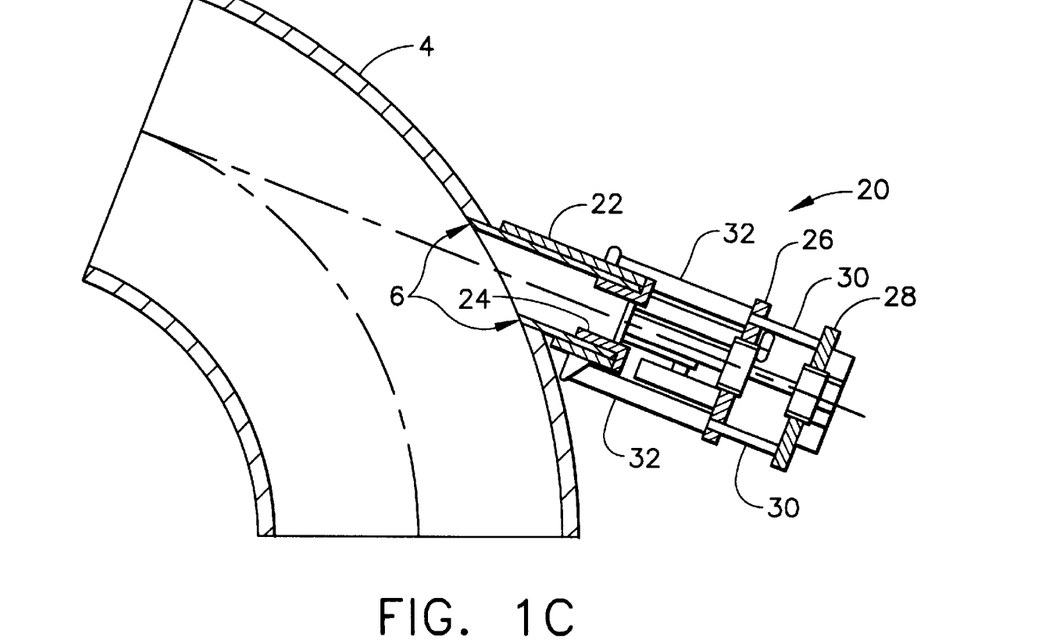

In the next step shown in FIG. 1C, a rotational/axial feed module 20 in accordance with the present invention is clamped onto the end of nozzle 2 via a nozzle clamp 22 having an internal sleeve bearing support 24. The sleeve bearing 24 is installed as close as possible to the large-bore pipe (e.g., elbow pipe) internal diameter to provide maximum rigidity for the centering bar (described hereinbelow). Module 20 comprises a fixed bearing plate 26 connected to the nozzle clamp 22 and a movable thrust bearing plate 28 which is axially displaceable relative to fixed bearing plate 26. The movable thrust bearing plate 28 is supported on the ends of three guide pins 30 which are respectively slidable in three axial feed cylinders 32 which connect the fixed bearing plate 26 to the nozzle clamp 22. The fixed bearing plate and nozzle clamp form a rigid mounting fixture which, once mounted on the piping, will remain in place for the entire repair sequence. This mounting fixture will serve as a quick mount device, precisely locating the subsequent tooling.

Module 20 further includes a rotational module (described in detail below) which is integral with the mounting fixture. The purpose of the rotational module is to provide power for rotational movement to the entire tool assembly. The rotational module can rotate 360° in either the clockwise or counterclockwise directions. An axial movement module (described in detail below) is integrated with the rotational module. The purpose of the axial movement module is to provide axial movement coordinated with rotational movement. The power transmission components (described in detail below) are external to the small-bore penetration piping (e.g., the nozzle) in order to allow greater access to the pipe internal diameter. The axial movement module has a quick change (collet type) mount to allow for quick change-out of subsequent tooling modules.

Figure 1D:
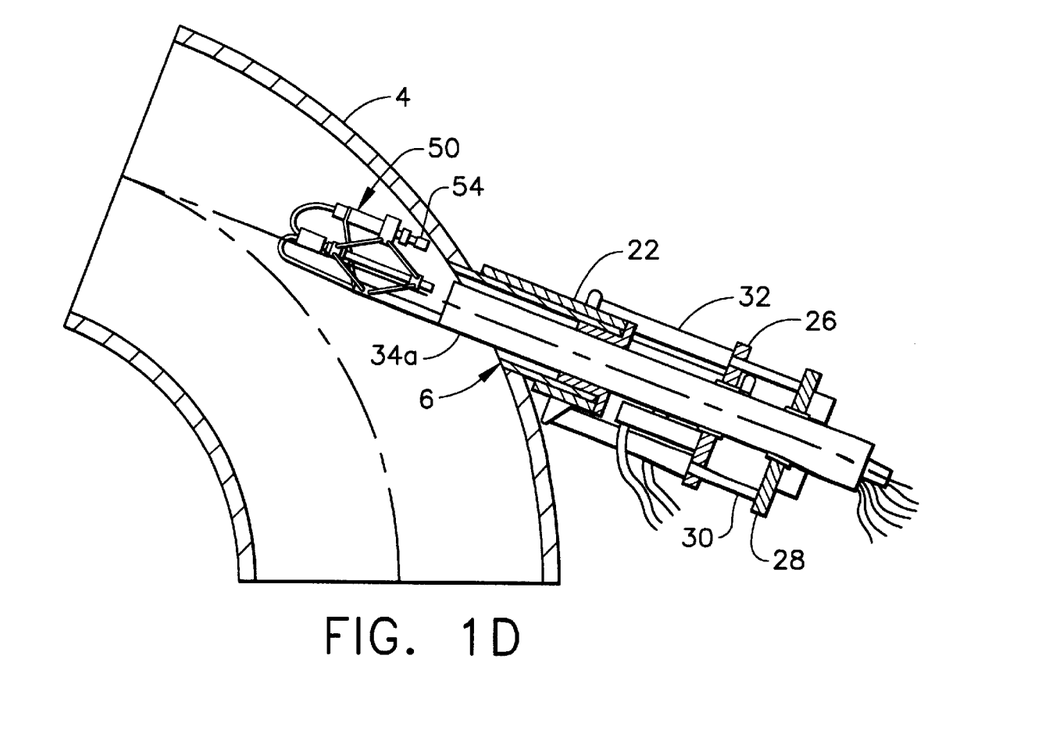

After the rotational/axial feed module 20 has been secured to the nozzle 2, a mapping/machining center bar 34a housing a work surface mapping/machining module 50 is installed as shown in FIG. 1D. Center bar 34a is in the form of a circular cylindrical tube having a longitudinal slot for allowing module 50 to pass from inside the center bar to a position outside the center bar.

For the work surface mapping, a contact probe 54 is installed in module 50, which probe is used to map the existing inside diameter configuration of the weld joint to be repaired. The mapping/machining center bar 34a is rotatable relative to the movable thrust bearing plate 28 and is axially displaceable therewith. Thus, the center bar 34a can be rotated and axially displaced to allow probe 54 to follow the contour of the weld joint.

The probe 54 is a spring-loaded contact device that senses when it contacts the surface and triggers a computer to plot coordinates for three axes at the point of contact. The internal diameter must be swept in circumferential circles at approximately 10° angular intervals in order to gather enough data to interpolate the existing geometric shape. The motion to index the probe radially is accomplished through the linkage arrangement of the scissors jack. The stroke of the probe is parallel with the axial movement of the mapping/machining center bar 34.

Figure 1E:
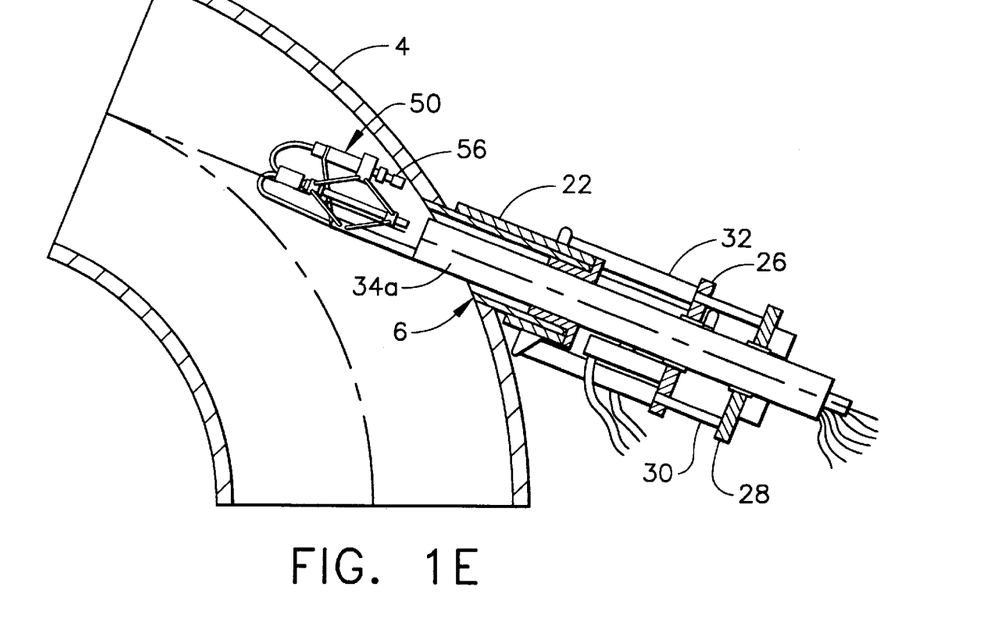

Upon completion of the contour mapping operation, the mapping/machining center bar 34a is removed from the rotational/axial feed module 20 and a high-speed carbide ball burr bit 56 is substituted for the contact probe 54 in the module 50. Ball burr bit 56 is powered by a DC brushless servo motor and an appropriate speed-reduction gear head. The mapping/machining center bar 34a is reinstalled in module 20, as shown in FIG. 1E. The motion to index the tool radially is identical to the probe indexing, with greater emphasis on rigidity. The center bar 34a is rotated and axially displaced as necessary as module 50 with bit 56 automatically removes a predetermined amount of material from the weld joint 6. Compressed air can be utilized to direct chip dispersion away from the tool, camera, bearings and other critical components.

Figure 1F:
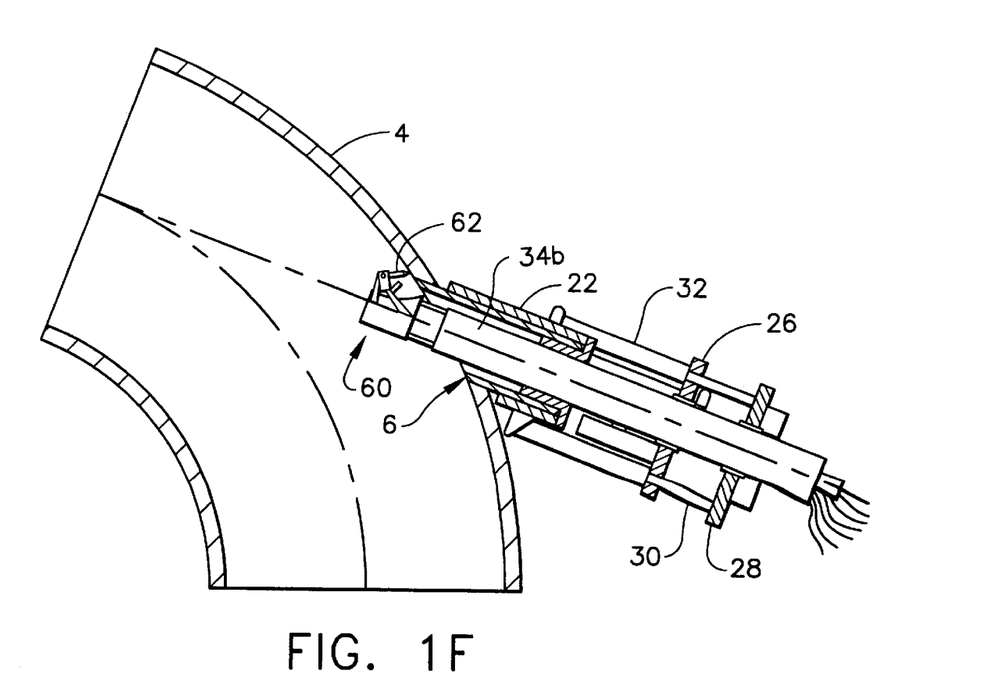

After the weld joint has been machined, the mapping/machining center bar 34a is again removed from the rotational/axial feed module 20 and replaced by a welding center bar 34b (see FIG. 1F). The welding center bar is lighter than the mapping/machining center bar and has a larger internal diameter bore accessibility for the greater amount of electrical interface required by the welding operation. The machining and welding center bars have identical quick mount features to provide repeatability between setups.

A welding module 60 is mounted on the end of welding center bar 34b. Axial displacement and rotation of welding center bar 34b are automatically controlled during welding such that a welding electrode 62 of welding module 60 follows the contour of the machined joint to be welded. Welding is accomplished by rotating the torch 360°, returning to 0° and starting again. The torch is a conventional water-cooled gas tungsten arc welding torch with mechanized movement and interface through the computer numerical controller to a separate welding power supply. Automatic voltage control sensing is used to provide precise tungsten electrode-to-workpiece distancing. A camera is focused on the weld puddle. Wire is fed to the tungsten electrode from a wire spool/feed assembly, located outside of the small-bore piping, facilitating wire spool change-out and envelope packaging. A wire feed nozzle guides the wire at the tungsten electrode. The torch must maintain a relative perpendicularity to the work surface, necessitating a separate axis for this function.

Figure 1G:
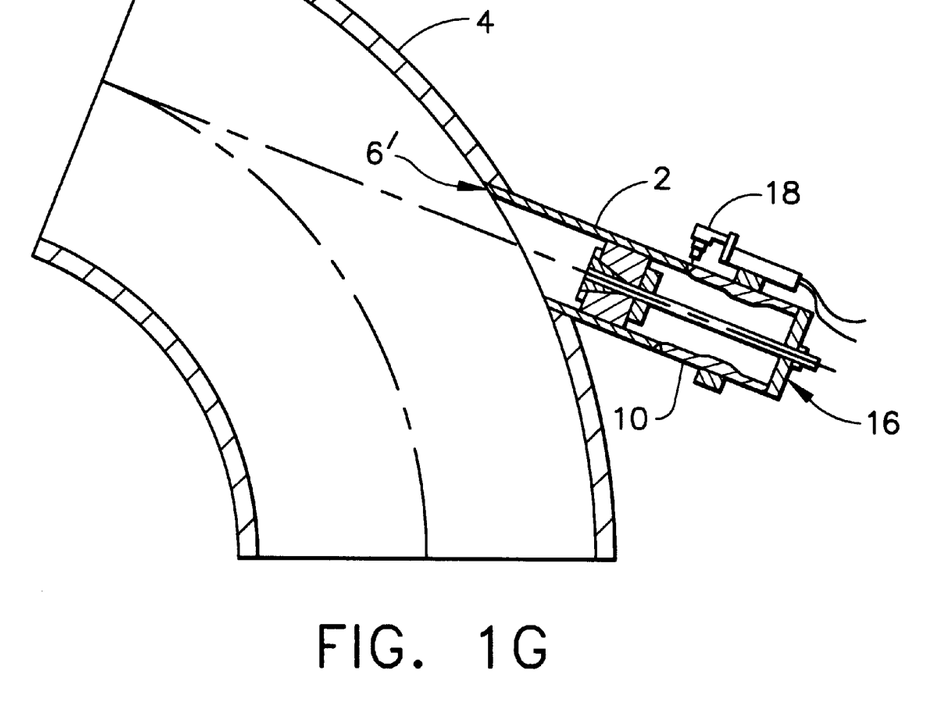

Upon completion of the repair of weld joint 6, the new safe end/connection pipe assembly is clamped to the nozzle 2 using a clamping fixture 16, as depicted in FIG. 1G. Then the joint between the nozzle 2 and the safe end 10 is welded using a weld head 18 rotatably mounted on the outer circumference of the safe end.

Figure 2A:
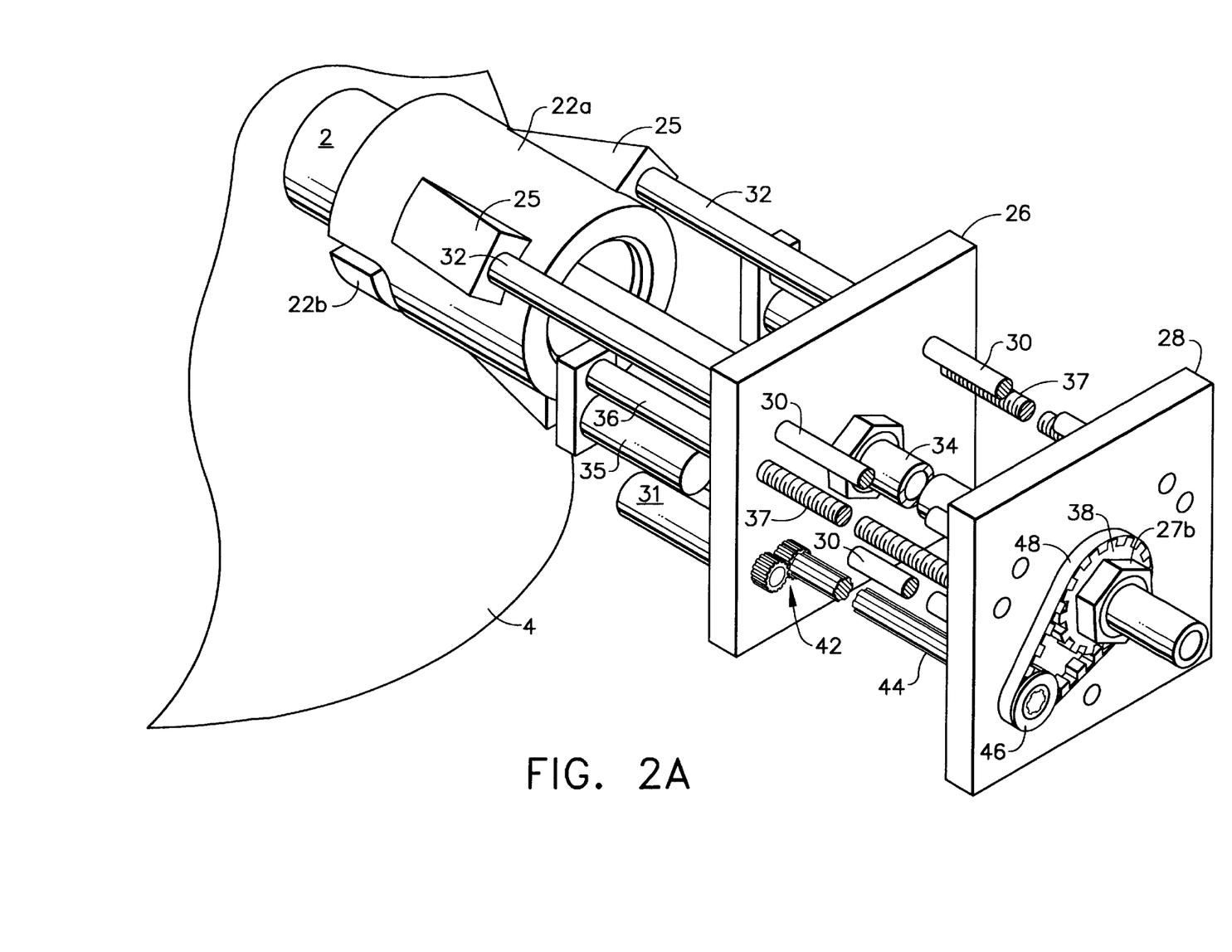
FIGS. 2A and 2B are an isometric view of a tool mounting fixture in accordance with the preferred embodiment of the invention.
Figure 2B:
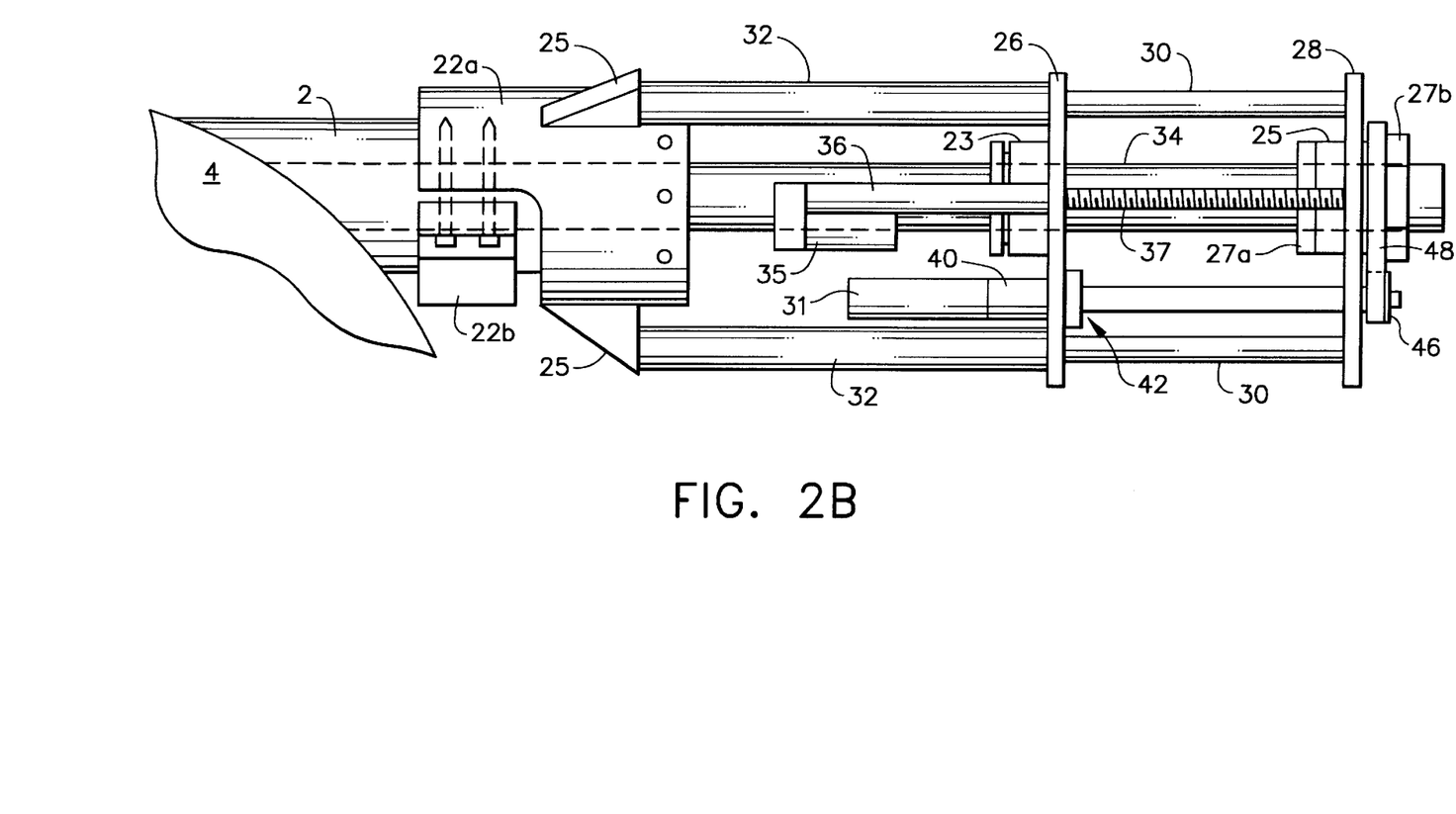

The rotational/axial feed module 20 in accordance with a preferred embodiment of the invention is shown in detail in FIGS. 2A and 2B. The nozzle clamp 22 comprises a mounting tube 22a and a clamping collar 22b which is tightened against the nozzle 2 to hold module 20 securely. The fixed bearing plate 26 is supported on the mounting tube 22a by means of three axial feed cylinders 32 (only two of which are visible in FIGS. 2A and 2B) attached to the mounting tube via respective brackets 25. The thrust bearing plate 28 is supported by three guide pins 30 which are respectively slidable in the three axial feed cylinders 32, whereby the thrust bearing plate 28 is axially displaceable relative to fixed bearing plate 26. Axial displacement of thrust bearing plate 28 is powered by a pair of servo motors 35 (only one of which is shown in FIG. 2B) which operate in tandem. Each servo motor 35 drives a respective linear actuator 36 mounted on the fixed bearing plate 26. Each linear actuator 36 is in turn coupled to a respective actuator screw 37 having its distal end connected to thrust bearing plate 28. In response to remote activation of servo motors 35, the thrust bearing plate 28 can be displaced axially relative to the fixed bearing plate 26.

The center bar 34 (i.e., either mapping/machining center bar 34a or welding center bar 34b) is rotatably mounted to thrust bearing plate 28 via a thrust bearing 25 and axially fixed relative to thrust bearing plate 28 by a quick clamp 27a and a quick clamp hub 27b. The hub 27b is locked onto the center bar using a set screw and has a friction clamp which is then tightened around the circumference of the center bar. Thus, center bar 34 is rotatable but not axially displaceable relative to thrust bearing plate 28. During axial displacement of thrust bearing plate 28 relative to fixed bearing plate 26, center bar 34 also displaces axially relative to fixed bearing plate 26. The rotational/axial feed module 20 has two sleeve bearings which support center bar 34 at two points along its axis, while allowing both rotation and sliding of center bar 34 relative to module 20. Sleeve bearing 24 is mounted to mounting tube 22a and sleeve bearing 23 is mounted to fixed bearing plate 26. In accordance with this arrangement, center bar 34 can be respectively inserted or withdrawn into the nozzle 2 by appropriate remote activation of the servo motors 35. The center bar 34 is hollow to allow passage therethrough of the wiring needed to control the various workhead modules during the mapping, machining and welding operations.

Each tool is rotatable about the center bar axis during mapping, machining and welding by rotating the center bar. This is accomplished by remote activation of a servo motor 31, which drives rotation of a pulley 38 mounted on the center bar 34 via a gear head 40, a gear assembly 42, a spline shaft 44, a timing belt pulley 46 and a timing belt 48. The spline shaft 44 is secured to pulley 46 and slidable relative to the mating gear of gear assembly 42. In addition, servo motors 35 are used to adjust the axial position of the center bar as necessary to ensure that the tool mounted on the inserted end of the center bar tracks the contour of the work surface during rotation.

Once mounted, the rotational/axial feed module 20 remains in place until the repair is completed. The center bar incorporates quick change features for assembly to the module 20. The end of the center bar which accesses the large-bore piping ID, features key-ways and a draw rod (not shown) for mounting specific workhead modules. In the event of a tool module failure within the large-bore piping, the draw rod can be loosened, and the workhead module can be separated from the center bar for removal.

Figure 3:
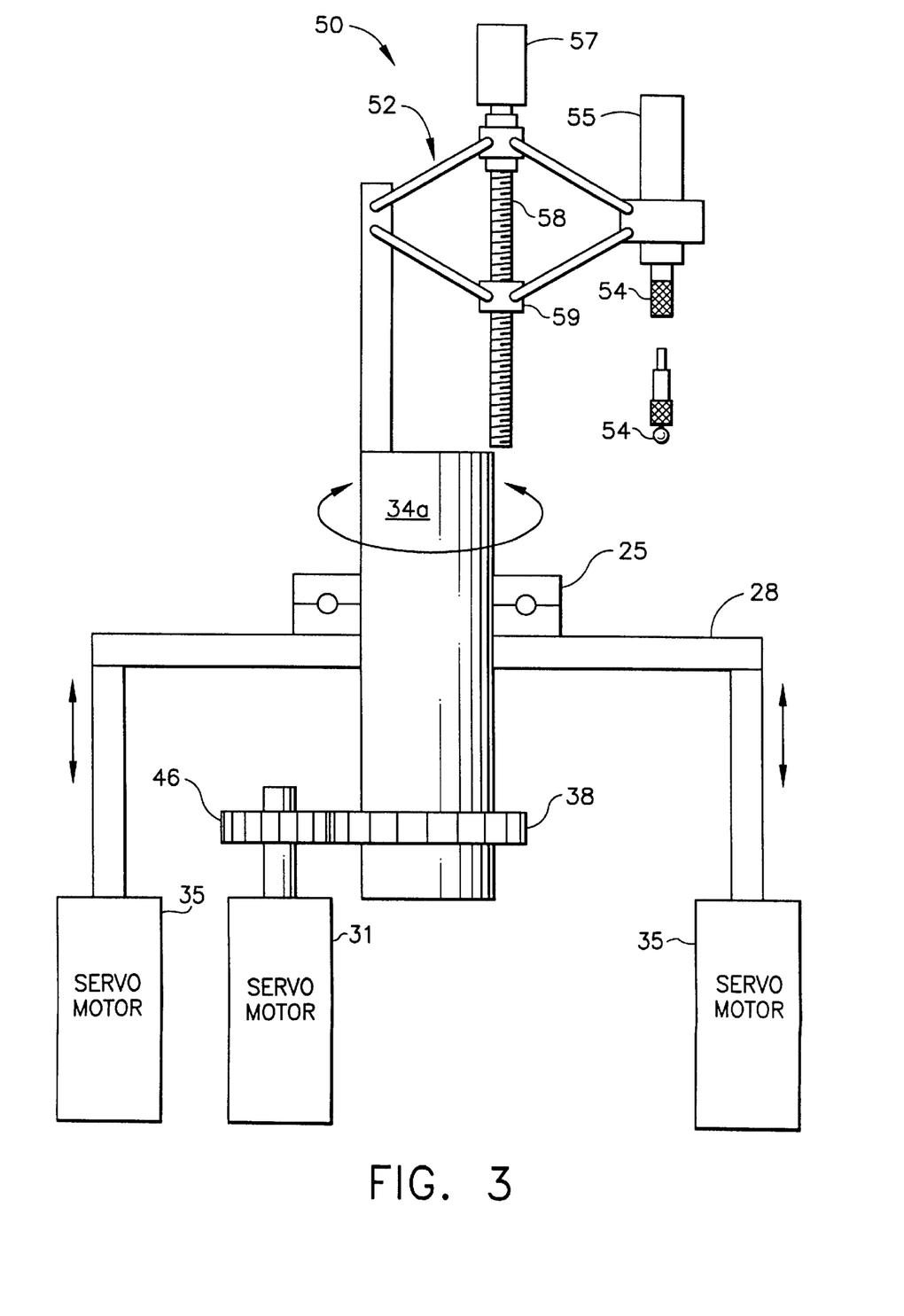
FIG. 3 is a schematic diagram of a mapping/machining module installed in the tool mounting fixture in accordance with the preferred embodiment of the invention.

The mapping/machining module 50 is schematically depicted in FIG. 3. Module 50 is mounted on the mapping/machining center bar 34a via a scissors jack mechanism 52. For the sake of facilitating understanding of the invention, scissors jack mechanism is depicted in FIG. 3 being mounted on the outside of the center bar. On the contrary, the scissors jack mechanism is mounted on the inside of the center bar and can collapse to fit inside the center bar tube. The portion of the center bar wall which is diametrally opposite the location at which the arms of the scissors jack mechanism are pivotably mounted, has a recess therein for allowing the scissors jack mechanism to expand beyond the diameter of the center bar tube. The module 50 has a radial indexing motor 57 for controlling the radial position of the workhead 53. The radial indexing motor collapses or expands the scissors jack mechanism 52 by causing rotation of an actuator screw 58 which is threadably coupled to a carriage 59.

The workhead 53 of module 50 has means for interchangeably receiving either a spring-loaded contact probe 54 or a high-speed carbide ball burr 56. The contact probe 54 is configured to mimic the tool bit and is used to map the contour of the work surface. The probe 54 has a conductive point with wires which are insulated from the rest of the holder. When the probe tip touches the work surface, the probe shorts out and sends a signal which stops further axial displacement. The probe can be mounted on a spring to allow enough give to prevent lockup of the driving gears.

The ball burr 56 is used to machine the work surface after the contour has been mapped. The workhead of module 50 has a milling motor 55 for rotating the ball burr at high speed.

Figure 4:
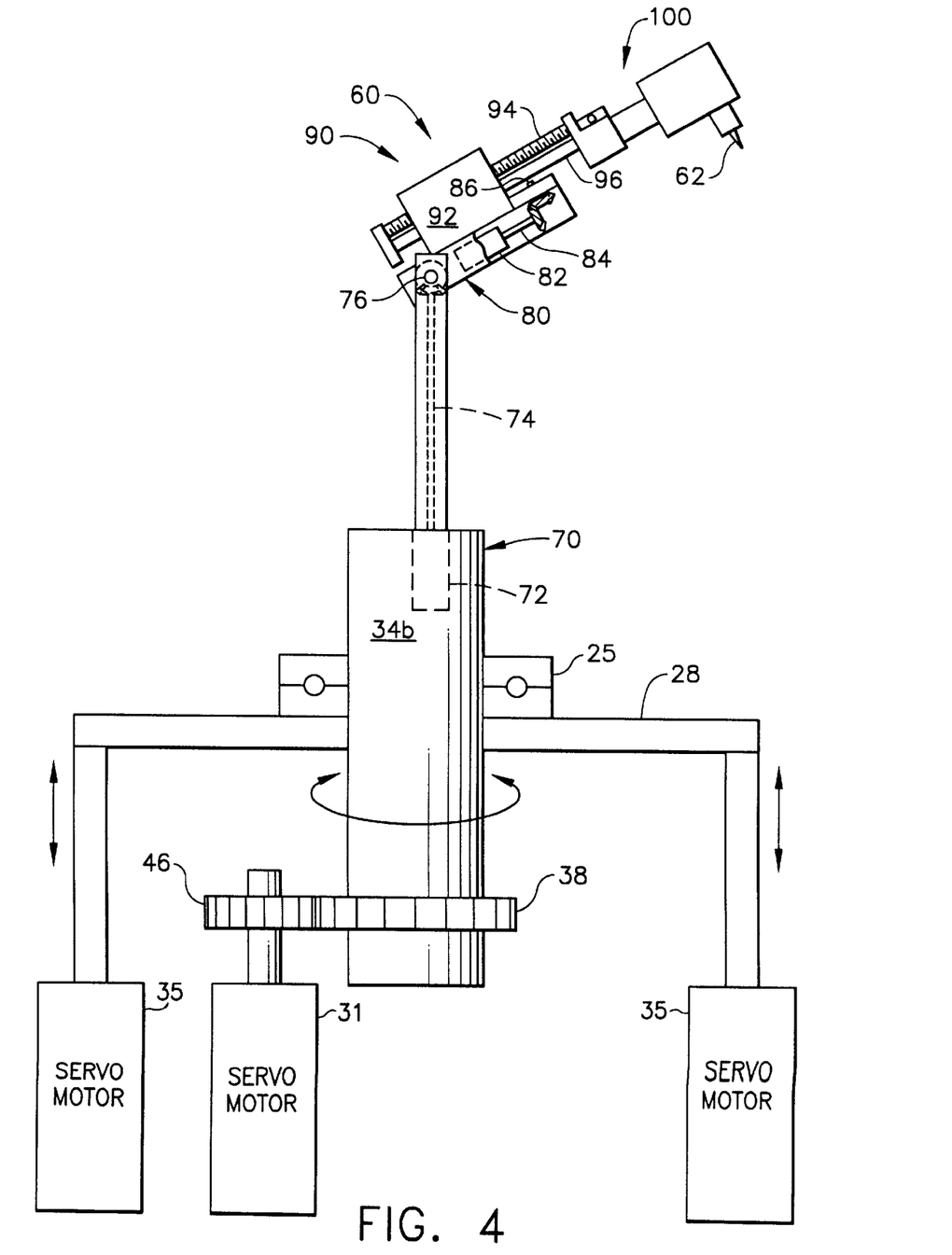
FIG. 4 is a schematic diagram of a multi-axis weld head module installed in the tool mounting fixture in accordance with the preferred embodiment of the invention.
Figure 5:
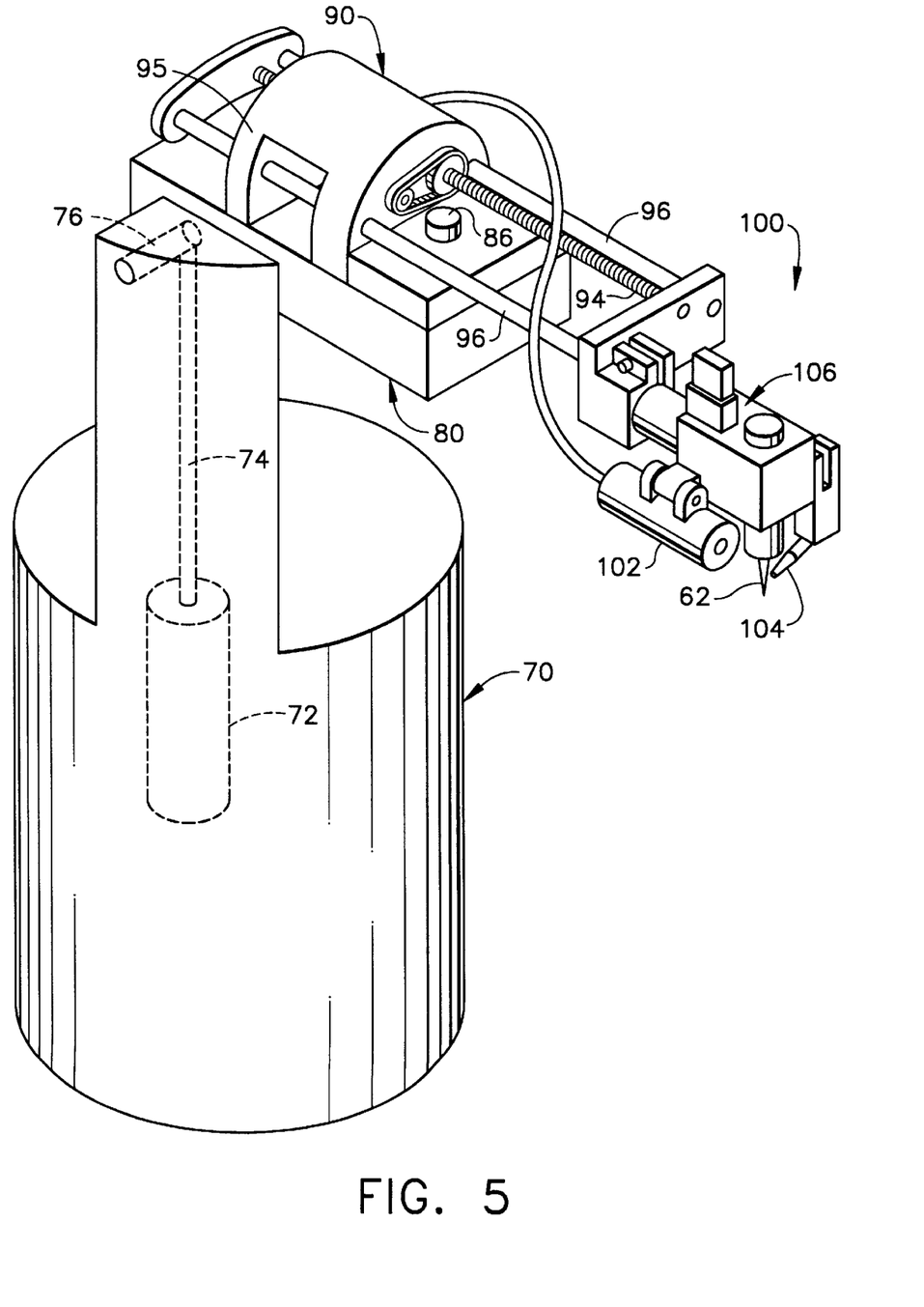
FIG. 5 is an isometric view of the weld head of the multi-axis weld head module in accordance with the preferred embodiment of the invention.

The welding module 60 is schematically depicted in FIGS. 4 and 5. As seen in FIG. 5, module 60 comprises a tilting module 70, a rotation module 80 and an oscillator module 90.

The tilting module 70 is attached to an end of the welding center bar 34a for rotation and axial displacement therewith. Tilting module 70 comprises a torch tilt motor 72 which drives rotation of an axle 76 via a drive shaft 74 and conventional gear means (schematically depicted in FIG. 4). The axle 76 is oriented perpendicular to the axis of rotation of welding center bar 34a.

The rotation module 80 is mounted on axle 76 and rotates about the axis of axle 76. Rotation module 80 comprises a weld head rotation motor 82 which drives rotation of an axle 86 via a drive shaft 84 and conventional gear means (schematically depicted in FIG. 4). The axle 86 is oriented perpendicular to the axis of rotation of axle 76.

The oscillator module 90 is mounted on axle 86 and rotates about the axis of axle 86. Oscillator module 90 comprises an oscillation motor 92 which drives rotation of an actuator screw 94 via a drive shaft (not shown) and conventional gear means (schematically depicted in FIG. 5). The actuator screw 94 is threadably engaged in a threaded bore formed in a weld head carriage 98, which is mounted on the ends of a pair of parallel guide pins 96. Each guide pin 96 is slidably supported at two points along its longitudinal axis by respective sleeve bearings 95 incorporated in the oscillation module. The carriage 98 and guide pins 96 connected thereto translate back and forth in response to clockwise and counterclockwise rotation respectively of the actuator screw 94

The carriage 98 carries the weld head 100, which comprises a welding torch having a tungsten electrode 62 for producing the welding arc, a wire nozzle 104 for feeding welding wire into the path of the welding arc and an automatic voltage control motor 106 which provides precise positioning of the electrode 62 relative to the workpiece. The automatic voltage control motor 106 is controlled by the welding power supply (not shown). A miniature camera 102 focuses on the weld puddle during welding.

The torch tilt motor 72, weld head rotation motor 82 and oscillation motor 92, when synchronized by the central computer 110 (see FIG. 6), provide all the necessary motions required to deposit the cladding. The main motions for the welding module are tilting, rotation and oscillation. Additional degrees of freedom are provided by rotation and axial displacement of the welding center bar 34a on which the welding module 60 is mounted, which are respectively driven by the rotational drive motor 31 and the axial drive motors 35.

In addition, the tilt module 70, the rotation module 80, the oscillation module 90 and the weld head 100 are configured such that when the actuator screw 94 is oriented parallel to the drive shaft 74, the entire welding module 50 lies within an envelope equal in diameter to the center bar tube diameter. This feature allows the welding module/welding center bar assembly to be slided through the sleeve bearing 24 (see FIG. 1C) of the rotational/axial feed module 20, through the small-bore piping 2 and into the large-bore piping 4.

Figure 6:
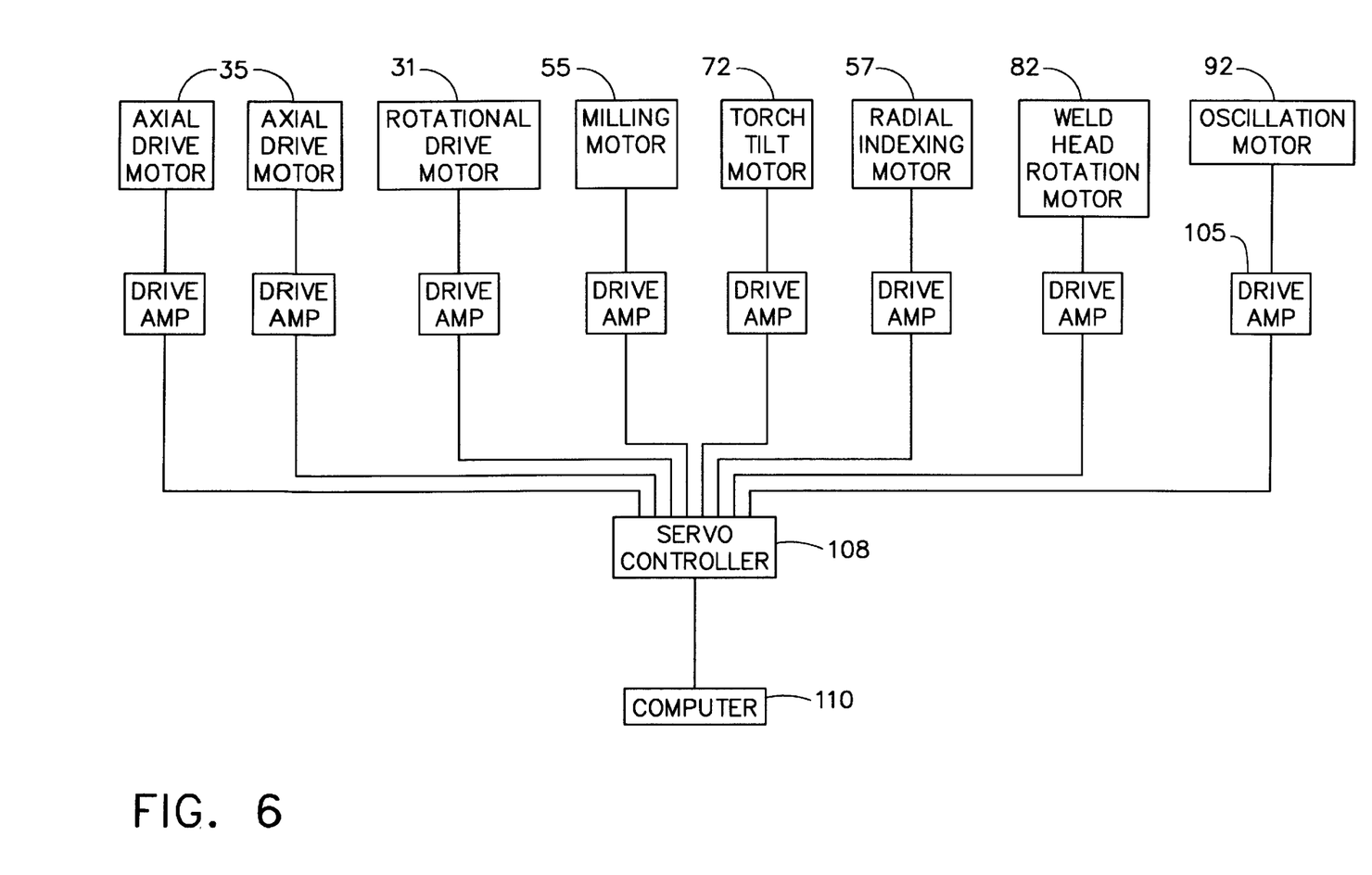
FIG. 6 is a block diagram of a motor control system in accordance with the preferred embodiment of the invention.

As depicted in FIG. 6, the various motors are controlled with a computer 110, a servo controller 108 and a drive amplification system comprising a plurality of drive amplifiers 105, one drive amplifier for each driven motor. The system is capable of simultaneously coordinating motion in a minimum of four axes. The preferred motors are brushless DC servo motors with resolvers. Alternatively, position feedback for the motors can be provided through line driven encoders.

The computer software enables the tooling to automatically map the existing work surface. The data from this map generates the necessary programming to subsequently machine grind the surface, and manipulate the weld head for deposition of the cladding. Each of these functions are automated to the degree that the operator interface is minimal. In order to maintain repeatability, and in the event of power failure or emergency stoppage, the tooling and CNC system operate on a return to "Zero" or "Home" concept. This can be done either mechanically or through a switching system. The Zero state corresponds to the tool being rotated to 0°, fully extended axial stroke and fully retracted workhead module. The system also has the ability to "save" the last position in computer memory in the event of a power failure or an emergency stoppage. Upon mapping the existing configuration to be followed, the computer control system coordinates all of the affected axes of motion in order to maintain a constant velocity of the probe, bit or electrode tip on the work surface. All programming is based upon projecting a circle of a given diameter when looking directly down the center of the small-bore piping. All other axes of motion (e.g., following the large-bore piping ID and angular penetration into the large bore is based on concentrically indexing about the small-bore piping centerline.

The preferred embodiment disclosed above is suitable for use in welding pipes in piping systems having complex geometry, such as the geometry depicted in FIG. 1A. Due to the severe geometry, additional axes of motion as well as tool stroke capabilities have been incorporated in this embodiment. However, the implementation of the concept of the present invention can be simplified somewhat for simpler geometries, such as the geometry shown in FIG. 7, in which a small-bore pipe 2' and a large-bore pipe 4' form a T connection. In this case, tilt of the oscillation module would be at 90° and can be accomplished without the use of motors. Also, rotation for the weld head could be executed by simply rotating the welding center bar 34b, thereby eliminating the need for a separate rotation module within the inside of the elbow.

The foregoing process and apparatus have been disclosed for the purpose of illustration. Variations and modifications of the disclosed process and apparatus will be readily apparent to practitioners skilled in the art of welding. Although the preferred embodiment has been disclosed in the context of repairing a joint connecting two pipes, the same equipment and method can be used to repair a joint connecting a pipe or nozzle to a vessel. All such variations and modifications which do not depart from the concept of the present invention are intended to be encompassed by the claims set forth hereinafter.

We claim:

1. An automatic system for mapping the contour of a joint connecting first and second pipe sections of a piping system, comprising:

a center bar having a longitudinal axis and a longitudinal channel;

means for supporting said center bar such that said center bar is rotatable only about its longitudinal axis and is translatable only in a direction parallel to its longitudinal axis;

means for clamping said supporting means onto an open end of said first pipe section so that said center bar is coaxial with said first pipe section;

means for driving rotation of said center bar about its longitudinal axis;

means for driving translation of said center bar along its longitudinal axis; and a mapping module attached to an end of said center bar, wherein said mapping module comprises a contact probe and means for radial indexing said contact probe.

2. The mapping system as defined in claim 1, further comprising:

computer means for controlling operation of said center bar rotation driving means, said center bar translation driving means and said radial indexing means so that said contact probe contacts the joint at a multiplicity of points; and wiring means passing through said longitudinal channel in said center bar for electrically connecting said computer means to said center bar rotation driving means, said center bar translation driving means and said radial indexing means.

3. The mapping system as defined in claim 2, further comprising computer storage means for storing a map of the locations at which said contact probe contacts the surface of the joint in response to signals from encoders coupled to said center bar rotation driving means, said center bar translation driving means and said radial indexing means.

4. The mapping system as defined in claim 1, wherein said center bar is a tube having a predetermined radius and said mapping module is collapsible into a configuration which fits inside said center bar.

5. The mapping system as defined in claim 1, wherein said center bar is a tube having a predetermined radius and said mapping module is collapsible into a configuration which fits inside a circular cylindrical envelope of said predetermined radius which is coaxial with said center bar.

6. The mapping system as defined in claim 1, wherein said radial indexing means comprises a scissors jack mechanism and a radial indexing motor for causing said scissors jack mechanism to selectively expand or collapse.

7. The mapping system as defined in claim 6, wherein said scissors jack mechanism is anchored inside said center bar and is extendible through a circumferential opening in said center bar diametrally opposite to the anchoring site.

8. An apparatus for supporting a tool inside a piping system having first and second pipe sections connected at a joint, comprising:

a center bar having a longitudinal axis and a longitudinal channel;

means for supporting said center bar such that said center bar is rotatable only about its longitudinal axis and is translatable only in a direction parallel to its longitudinal axis;

means for clamping said supporting means onto an open end of said first pipe section so that said center bar is coaxial with said first pipe section;

means for driving rotation of said center bar about its longitudinal axis; and means for driving translation of said center bar along its longitudinal axis.

9. The apparatus as defined in claim 8, wherein said center bar supporting means comprises:

a fixed bearing plate attached to said clamping means;

a sleeve bearing secured to said fixed bearing plate for supporting said center bar;

a plurality of mutually parallel guide pins secured at one end to said fixed bearing plate;

a thrust bearing plate slidably mounted on said guide pins;

a thrust bearing secured to said thrust bearing plate for supporting said center bar; and means for preventing longitudinal displacement of said center bar relative to said thrust bearing plate, whereby said center bar is rotatable relative to said fixed bearing plate and said thrust bearing plate, and slidable relative to said fixed bearing plate.

10. The apparatus as defined in claim 9, wherein said center bar translation driving means comprises an actuator screw for coupling said thrust bearing plate to an axial drive motor mounted on said fixed bearing plate.

11. The apparatus as defined in claim 9, wherein said center bar rotation driving means comprises a first pulley mounted on said center bar, a second pulley mounted on said thrust bearing plate, a belt for coupling said first and second pulleys, and means for driving rotation of said second pulley.

12. The apparatus as defined in claim 11, wherein said second pulley rotation driving means comprises a rotational drive motor mounted on said fixed bearing plate and coupled to said second pulley via a gear assembly and a spline shaft.

13. The apparatus as defined in claim 9, wherein said means for preventing longitudinal displacement of said center bar relative to said thrust bearing plate comprises a quick release clamp.

14. The apparatus as defined in claim 8, further comprising a welding module attached to an end of said center bar, wherein said welding module comprises a welding torch having an electrode and means for oscillating said welding torch relative to the joint.

15. The apparatus as defined in claim 14, further comprising computer means for controlling operation of said center bar rotation driving means, said center bar translation driving means and said oscillating means so that said electrode follows the contour of the joint during welding; and wiring means passing through said longitudinal channel in said center bar for electrically connecting said computer means to said center bar rotation driving means, said center bar translation driving means and said oscillating means.

16. The apparatus as defined in claim 15, further comprising computer storage means for storing a map of the contour of the surface of the joint.

17. The apparatus as defined in claim 14, further comprising:

first pivot means for pivotably supporting said oscillating means for rotation about a first axis;

means for driving rotation of said oscillating means about said first axis;

second pivot means for pivotably supporting said first pivot means for rotation about a second axis perpendicular to said longitudinal axis of said center bar; and means for driving rotation of said first pivot means about said second axis.

18. The apparatus as defined in claim 17, further comprising:

computer means for controlling operation of said center bar rotation driving means, said center bar translation driving means, said oscillating means, said means for driving rotation of said oscillating means, and said means for driving rotation of said first pivot means so that said electrode stays perpendicular to the surface of the joint as said electrode follows the contour of the joint during welding; and wiring means passing through said longitudinal channel in said center bar for electrically connecting said computer means to said center bar rotation driving means, said center bar translation driving means, said oscillating means, said means for driving rotation of said oscillating means, and said means for driving rotation of said first pivot means.

19. The apparatus as defined in claim 14, wherein said center bar has a predetermined radius and said welding module is collapsible into a configuration which fits inside a circular cylindrical envelope of said predetermined radius which is coaxial with said center bar.

20. The apparatus as defined in claim 14, wherein said oscillating means comprises an actuator screw, an oscillation motor for driving rotation of said actuator screw, and means for transforming rotation of said actuator screw into translation of said welding torch.

* * * * *